United States Patent
Rekinen

(10) Patent No.: US 7,286,816 B2
(45) Date of Patent: Oct. 23, 2007

(54) METHOD FOR REMOTE MONITORING OF ELEVATORS AND/OR ESCALATORS AND/OR MOVING WALKWAYS

(75) Inventor: Tero Rekinen, Helsinki (FI)

(73) Assignee: Kone Corporation, Helsinki (FI)

( * ) Notice: Subject to any disclaimer, the term of this patent is extended or adjusted under 35 U.S.C. 154(b) by 160 days.

(21) Appl. No.: 11/127,290

(22) Filed: May 12, 2005

(65) Prior Publication Data
US 2005/0255887 A1  Nov. 17, 2005

Related U.S. Application Data

(63) Continuation of application No. PCT/FI03/00938, filed on Dec. 9, 2003.

(30) Foreign Application Priority Data
Jan. 2, 2003  (FI)  ................... 20030008

(51) Int. Cl.
  *H04M 1/66*  (2006.01)
  *H04M 1/68*  (2006.01)
  *H04M 3/16*  (2006.01)

(52) U.S. Cl. ............ 455/411; 455/410; 455/550.1; 455/551; 455/558; 380/247; 380/255; 235/382; 235/382.5

(58) Field of Classification Search ........ 455/411, 455/410, 550.1, 551, 558; 380/247, 255; 235/382, 382.5
See application file for complete search history.

(56) References Cited

U.S. PATENT DOCUMENTS

| | | | |
|---|---|---|---|
| 5,557,679 A | * | 9/1996 | Julin et al. ............ 380/249 |
| 6,199,161 B1 | * | 3/2001 | Ahvenainen ............ 713/155 |
| 2001/0003527 A1 | | 6/2001 | Shinohara et al. |
| 2002/0059412 A1 | | 5/2002 | Azpitarte |
| 2003/0174070 A1 | | 9/2003 | Garrod et al. |
| 2003/0206099 A1 | | 11/2003 | Richman |
| 2004/0053642 A1 | * | 3/2004 | Sandberg et al. ........ 455/558 |

FOREIGN PATENT DOCUMENTS

JP  2002-92765 A  3/2002

OTHER PUBLICATIONS

Telular, Phonecell SX4e GSM User Manual, Aug. 17, 2000, p. 19.*

* cited by examiner

Primary Examiner—Lester G. Kincaid
Assistant Examiner—Steven Lim
(74) Attorney, Agent, or Firm—Birch, Stewart, Kolasch & Birch, LLP

(57) ABSTRACT

The present invention relates to a method for handling the PIN code of the SIM card of a GSM terminal of a remote monitoring device used for remote monitoring of elevators and/or escalators and/or moving walkways. According to the present invention, when the aforesaid remote monitoring device and GSM terminal are to be taken in use, the aforesaid SIM card is assigned a public default PIN code and a randomly generated PIN code. By applying the present invention, the data security of the handling of the PIN code of the SIM card of the GSM terminal of the remote monitoring device is substantially improved.

9 Claims, 1 Drawing Sheet

Figure 1:
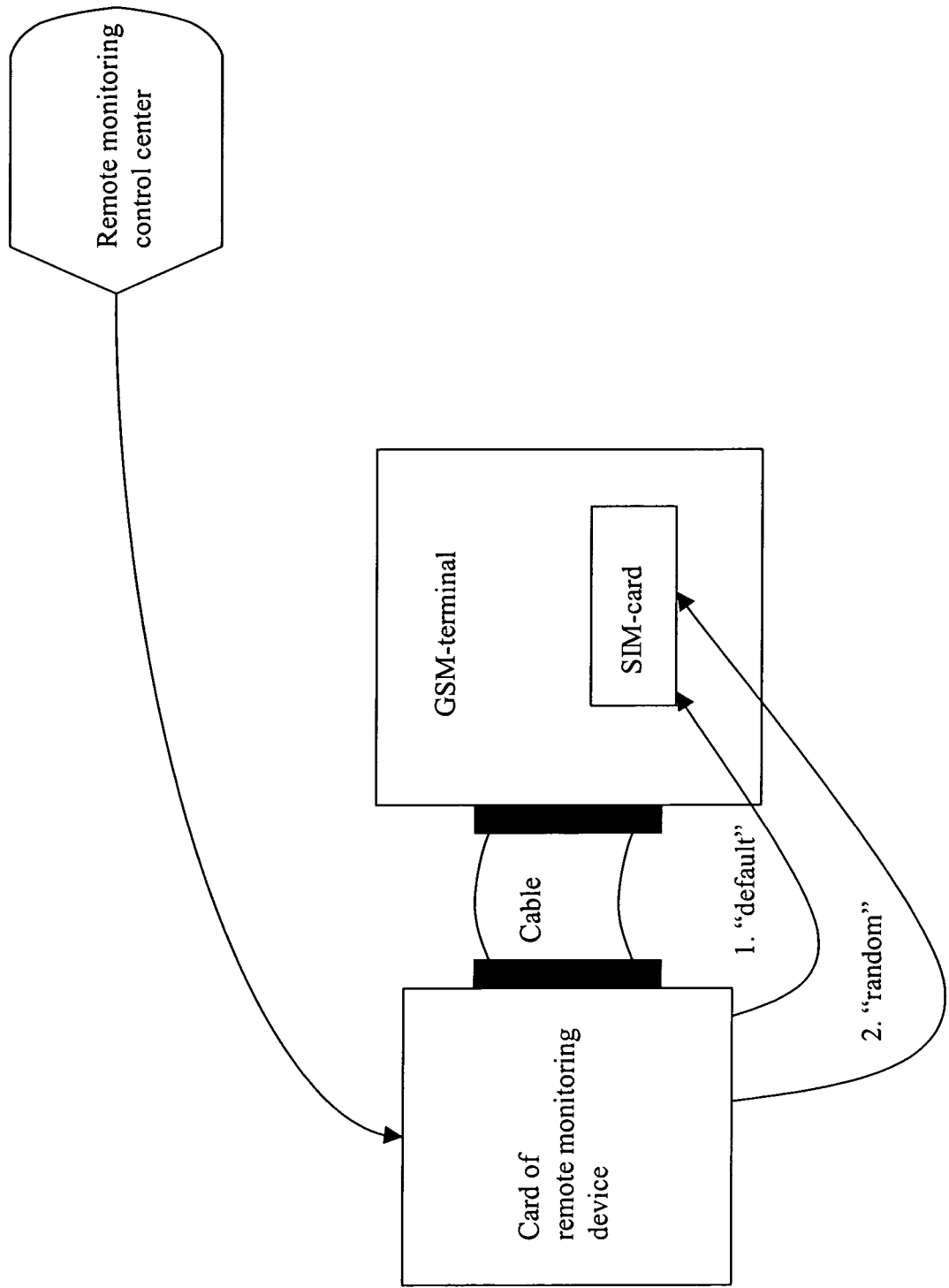

METHOD FOR REMOTE MONITORING OF ELEVATORS AND/OR ESCALATORS AND/OR MOVING WALKWAYS

This application is a Continuation of copending PCT International Application No. PCT/FI2003/000938 filed on Dec. 9, 2003, which designated the United States, and on which priority is claimed under 35 U.S.C. § 120. This application also claims priority under 35 U.S.C. § 119(a) on Patent Application No(s). FI20030008 filed in Finland on Jan. 2, 2003. The entire contents of each of the above documents is hereby incorporated by reference The present invention relates to a method as defined in the preamble of claim 1 for handling the PIN code of the SIM card of a GSM terminal of a remote monitoring device used for remote monitoring of elevators and/or escalators and/or moving walkways.

Remote monitoring refers to procedures used in general to monitor the condition and state of repair of an apparatus by measuring parameters whose changes reflect changes in the condition and state of repair of the apparatus. In remote monitoring, the condition and state of repair of the apparatus is generally monitored on a regular basis. When a change occurs in the condition and state of repair, a more accurate fault diagnosis can be made. Fault diagnostics again refers to procedures used to detect and identify a fault and to find the cause of the fault. The most important function of a fault diagnostics system is to detect a fault reliably and positively as early as possible. Sometimes the diagnostics system has been programmed to produce a suggestion as to how the fault detected could be eliminated. In this way, it is possible to implement the determination of the need for preventive maintenance of equipment.

Remote monitoring of elevators refers to monitoring of the condition and state of repair of the elevators from a remote location by using a telecommunication connection. In remote monitoring of the state and condition of elevators, the elevators themselves give warnings of faults to be expected. Thus, the wear of components can be detected before they fail completely. Therefore, a fixed target value can be set beforehand for the failure frequency of elevators to measure the reliability and quality of the elevators.

In prior art, a remote monitoring device used at present for remote monitoring of elevators and/or escalators and/or moving walkways comprises a GSM terminal, which communicates over a wireless telecommunication connection with a remote monitoring control center, to which it transmits information about the condition and state of repair of the elevators and/or escalators and/or moving walkways. For the establishment of a telecommunication connection from the GSM terminal to the remote monitoring control center, the GSM terminal comprises a SIM card, which is activated by a so-called PIN code.

The SIM card is a subscriber identification unit used in wireless communication. The PIN code is a user and terminal-specific identification number assigned to the SIM card.

In a known manner, the PIN code is used to prevent unauthorized use of the SIM card of the GSM terminal of a remote monitoring device, as such use causes undesirable costs to the holder of the terminal. The remote monitoring device gives the PIN code automatically each time the SIM card requests it, e.g. in connection with the switch-on of power.

When the GSM terminal of the device for remote monitoring of elevators and/or escalators and/or moving walkways is to be taken in use, the installer of the telecommunication connection must have the SIM card with him and know the PIN code of the SIM card to be installed. The SIM card needed for the installation is owned either by the client or by the company installing and/or maintaining the elevator and/or escalator and/or moving walkway. In connection with the installation or after it, there is a possibility that this SIM card used for the installation and the PIN code required for its use are misused, or that the SIM card together with the PIN code associated with it is lost, which would cause unnecessary costs to the owner of the SIM card.

The main problem with solutions according to the present state of the art is data security of the PIN code which is required when the SIM card of the GSM terminal of a remote monitoring device is taken in use and which has to be input to it.

The object of the present invention is to overcome the shortcomings and problems encountered in the abovementioned prior-art solutions.

In more definite terms, the method of the invention for handling the PIN code of the SIM card of the GSM terminal of a remote monitoring device used for remote monitoring of elevators and/or escalators and/or moving walkways is characterized by what is disclosed in the characterization part of claim 1. The features of certain preferred embodiments of the invention are disclosed in the sub-claims.

By using the method of the invention, several significant advantages over prior art are achieved.

In a preferred embodiment, the present invention improves the data security of the handling of the PIN code of the SIM card of the GSM terminal of the remote monitoring device. Improvement of data security is possible because the PIN code created in the remote monitoring control center via random generation is not known to anybody or printed on paper but is stored both in the memory of the remote monitoring device and in the remote monitoring control center.

Another advantage achieved by the present invention is that the randomly generated actual PIN code currently in use and given last need never be input manually. Therefore, data security is substantially improved because even the installer does not know the code in question.

A further advantage achieved by the present invention is that it makes it possible to replace the remote monitoring device, GSM terminal or SIM card e.g. with a spare part without impairing security.

A company maintaining elevators and/or escalators and/or moving walkways by utilizing remote monitoring can advantageously use the security of the data transfer in remote monitoring of elevators and/or escalators and/or moving walkways as a marketing argument.

The present invention mainly relates to data transfer in wireless remote monitoring via telecommunication.

It can likewise be applied in data communication in the case of various network connections installed in elevators. Such network connections are e.g. WLAN, LAN, Ethernet, etc.

The present invention concerns a method for handling the PIN code of the SIM card of a GSM terminal of a remote monitoring device used for remote monitoring of elevators and/or escalators and/or moving walkways. According to the most preferred embodiment of the present invention, when the remote monitoring device and the GSM terminal are to be taken in use, the abovementioned SIM card is assigned a public default PIN code and a randomly generated PIN code. The default PIN code is preferably used when the remote monitoring device and its GSM terminal and SIM card are taken in use for the first time, to allow functional data communication between the aforesaid GSM terminal and the remote monitoring control center, whereupon, via a first configuration call, the remote monitoring device is given the randomly generated code, which is automatically taken in use.

According to an embodiment of the present invention, the public default PIN code is given before the randomly generated PIN code. According to another embodiment of the present invention, the randomly generated PIN code is given before the public default PIN code.

According to a preferred embodiment of the present invention, the randomly generated PIN code is created automatically in the remote monitoring control center, where the randomly generated PIN code is stored and from where the randomly generated PIN code is sent to the card of the remote monitoring device. According to another embodiment of the invention, the public default PIN code and the randomly generated PIN code are stored in the memory of the card of the remote monitoring device.

In addition, according to an embodiment of the present invention, the public default PIN code is transferred from the card of the remote monitoring device to the SIM card as a randomly generated PIN code when the remote monitoring device and GSM terminal are taken in use.

According to the present invention, when the PIN code is requested from the card of the remote monitoring device in connection with switch-on of power to the GSM terminal, a PIN code is always automatically given to the SIM card of the GSM terminal. According to an embodiment of the present invention, the SIM card is given both a public default PIN code and a randomly generated PIN code in either order in such manner that, when the PIN code given first is wrong, the other PIN code is given automatically.

According to another embodiment of the invention, power is connected to the GSM terminal in connection with installation or replacement of the aforesaid GSM terminal or a change of the back-up battery of the SIM card or remote monitoring device or when the system is recovering from a disturbance situation. In addition, when the SIM card of the GSM terminal is being changed, both a public default PIN code and a randomly generated PIN code are given.

According to the present invention, the public default PIN code used is preferably any code defined and/or agreed with a local and/or global operator for a new SIM card of the GSM terminal.

In the following, the invention will be described in detail with reference to the attached drawing, which illustrates the working principle of the method of the invention for handling the PIN code of the SIM card of a GSM terminal of a remote monitoring device used for remote monitoring of elevators and/or escalators and/or moving walkways.

According to the present invention, when the card of the remote monitoring device for remote monitoring of elevators and/or escalators and/or moving walkways is to be taken in use, the SIM card of the GSM terminal connected to it via cable has to be first given a socalled public default PIN code; "default", which may be any number agreed and/or defined with a local and/or global operator. After this, the SIM card is given via the remote monitoring card a new PIN code; "random", which has been generated by a fully random procedure in the control center of the system for remote monitoring of elevators and/or escalators and/or moving walkways. This randomly generated PIN code, "random", is subsequently only stored in the control center controlling remote monitoring of elevators and/or escalators and/or moving walkways and in the memory of the card of the remote monitoring device. The public default PIN code, "default" is stored in the memory of the remote monitoring device.

After the GSM terminal of the remote monitoring device for remote monitoring of elevators and/or escalators and/or moving walkways has been given a randomly generated PIN code, "random", it is possible to set up a communication connection for the transmission of remote monitoring data from the aforesaid GSM terminal to the control center controlling the remote monitoring of elevators and/or escalators and/or moving walkways so as to guarantee data security of the connection.

It is very obvious that in the future the method of the present invention will be applicable even in other automatically operated devices monitored remotely by utilizing data communication based on GSM technology.

Moreover, the embodiments of the present invention are not necessarily limited to any one of the embodiments described above, but different embodiments can be combined in part or in whole within the framework of technical conditions. Likewise, parts of different embodiments can be used to form embodiments according to the basic concept of the invention that have not been described here.

The invention claimed is:

1. A method for handling the PIN code of a SIM card usable in a GSM terminal of a remote monitoring device used for remote monitoring of elevators and/or escalators and/or moving walkways, comprising:
   a) assigning a public default PIN code to the SIM card when the remote monitoring device and the GSM terminal are to be taken in use; and
   b) assigning a randomly generated PIN code to the SIM card when the remote monitoring device and the GSM terminal are to be taken in use,
   wherein the aforesaid SIM card is provided both a public default PIN code and a randomly generated PIN code in either order in such manner that, when the PIN code given first is wrong, the other PIN code is given automatically.

2. The method according to claim 1, wherein the step a) of assigning the public default PIN code is performed before the step b) of assigning the randomly generated PIN code.

3. The method according to claim 1, wherein the step b) of assigning the randomly generated PIN code is performed before the step a) of assigning said public default PIN code.

4. The method according to any of claims 1 to 3, wherein said step b) of assigning the randomly generated PIN code is performedautomatically in the remote monitoring control center and includes storing the randomly generated PIN code on the card of the remote monitoring device.

5. The method according to claim 1, wherein the public default PIN code and the randomly generated PIN code are stored in the memory of the card of the remote monitoring device.

6. The method according to claim 1, further comprising:
   c) transferring the public default PIN code from the card of the remote monitoring device to the SIM card as a randomly generated PIN code when the aforesaid remote monitoring device and GSM terminal are used.

7. The method according to claim 6, wherein, during said step c) of transferring, when the PIN code is requested from the card of the remote monitoring device in connection with switch-on of power to the aforesaid GSM terminal, a PIN code is always automatically given to the SIM card of the GSM terminal.

8. The method according to claim 7, comprising connnecting power to the aforesaid GSM terminal in association with installation or replacement of the aforesaid GSM terminal or a change of the back-up battery of the SIM card or remote monitoring device or when the system is recovering from a disturbance situation.

9. The method according to claim 1, wherein the public default PIN code is any code defined and/or agreed with a local and/or global operator for a new SIM card of the aforesaid GSM terminal.

* * * * *